Sept. 5, 1939. R. M. NARDONE Re. 21,198
INTERNAL COMBUSTION ENGINE
Original Filed Sept. 10, 1932 2 Sheets-Sheet 1
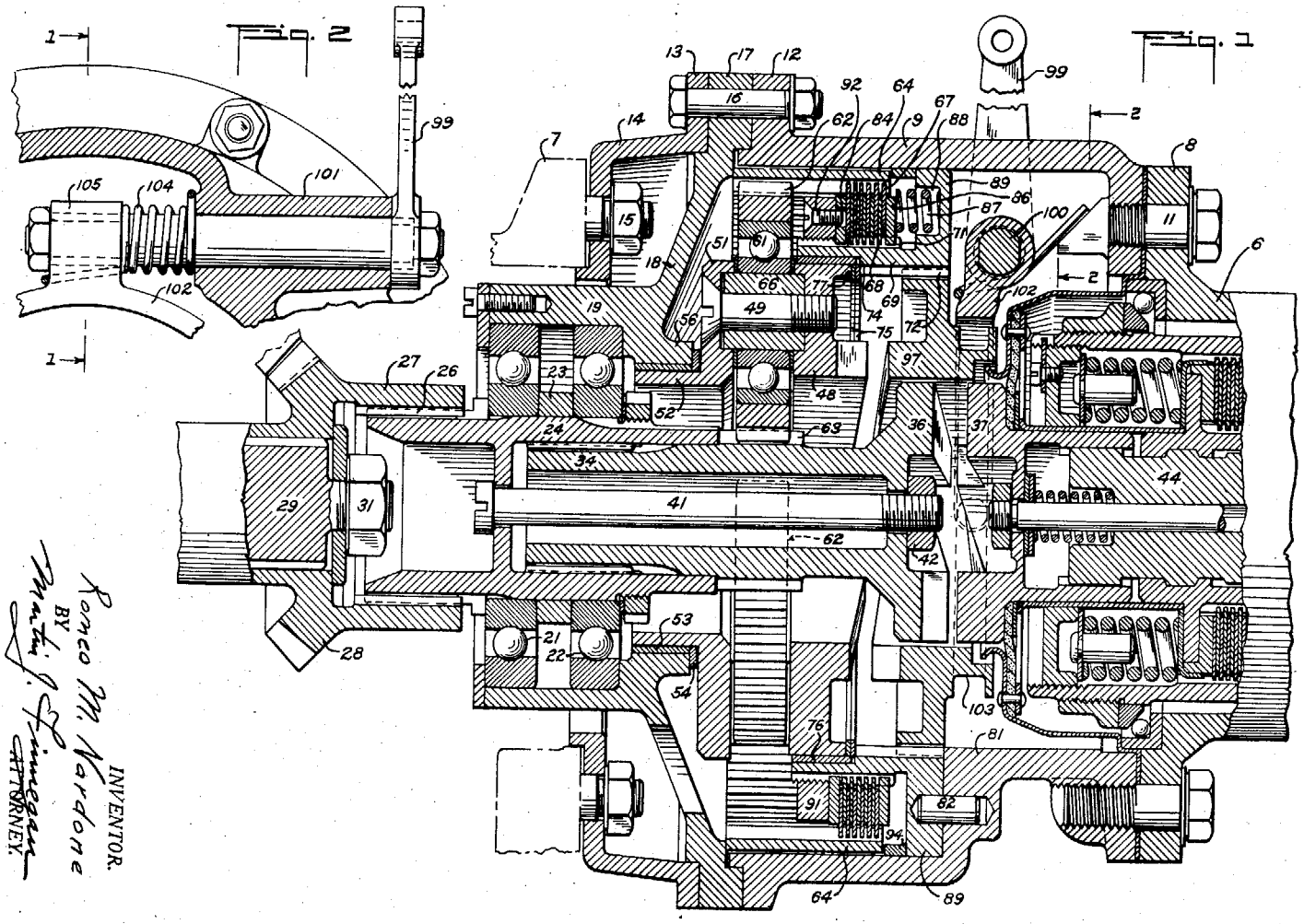
INVENTOR.
Romeo M. Nardone
BY
Martin J. Finnegan
ATTORNEY.

Sept. 5, 1939. R. M. NARDONE Re. 21,198
INTERNAL COMBUSTION ENGINE
Original Filed Sept. 10, 1932 2 Sheets-Sheet 2
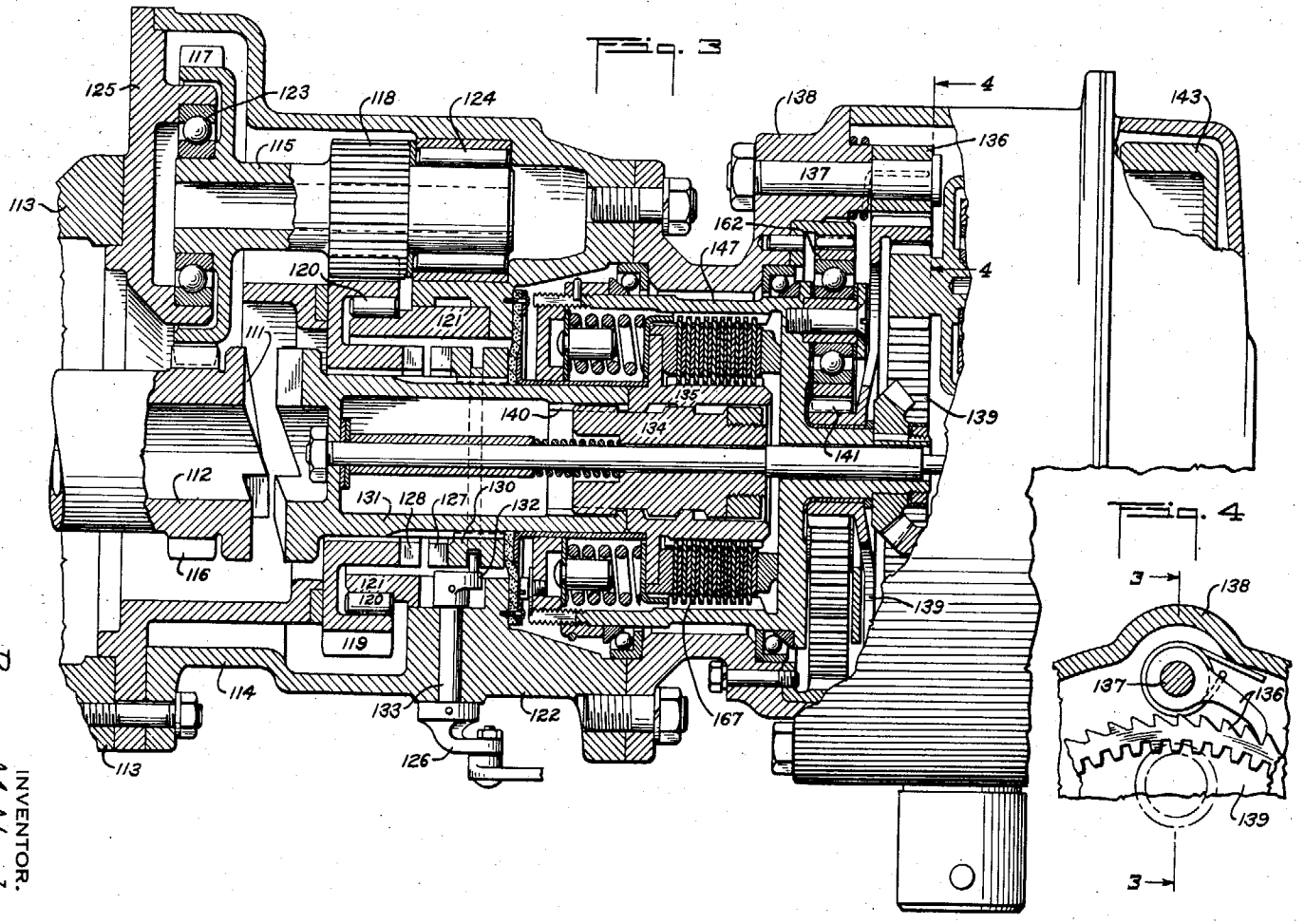
INVENTOR.
Romeo M. Nardone
BY Martin J. Finnegan
ATTORNEY.

Reissued Sept. 5, 1939

Re. 21,198

UNITED STATES PATENT OFFICE 21,198

INTERNAL COMBUSTION ENGINE

Romeo M. Nardone, East Orange, N. J., assignor, by mesne assignments, to Eclipse Aviation Corporation, East Orange, N. J., a corporation of New Jersey Original No. 1,967,966, dated July 24, 1934, Serial No. 632,622, Sepember 10, 1932. Application for reissue December 21, 1935, Serial No. 55,570

19 Claims. (Cl. 123—179)

This invention relates to internal combustion engines and more particularly to means for controlling the rotation of the propeller shaft or other loads normally driven thereby.

While the invention is of decided utility when applied to engines used on airplanes, in which application it functions to bring the propeller promptly to a full stop in response to de-energization of the engine, it is to be understood that in its broader aspects the invention is applicable to any internal combustion engine adapted to drive a load which has the objectionable tendency to continue in motion after de-energization of the engine.

The invention is shown herein as combined with an engine starting mechanism and cooperating therewith to such an extent that the elements of the starter are utilized as part of the means for bringing the propeller shaft or other load to a full stop when so desired.

If an airplane engine stalls for any reason, it is desirable to bring both the engine and its propeller to a dead stop in order to decrease the propeller drag and prevent any aggravation of the injurious effects which such failure of the engine produces. It is particularly necessary that this free rotation of the propeller be prevented in any installation where the propeller is located off the center line of the plane, as for example in a multi-engine plane. It is accordingly an object of the present invention to prevent such continued rotation of the propeller of an airplane engine which has for any reason failed.

In the drawings,

Fig. 1 is a longitudinal sectional view of the device embodying the invention;

Fig. 2 is a transverse sectional view taken along the line 2—2 of Fig. 1;

Fig. 3 is a longitudinal sectional view of a second embodiment of the invention; and Fig. 4 is a transverse sectional view along the line 4—4 of Fig. 3.

Referring to the drawings and particularly Figures 1 and 2, the invention is therein shown embodied in a mechanism adapted to be interposed between the engine-engaging end 6 of a starter unit, and the mounting flange 7 of the engine crankcase, with which the flange 8 of the starter normally registers. When the present invention is used in conjunction with such a starter, it may be embodied in a substantially cylindrical casing having a section 9 registering with the starter flange 8 and secured thereto by suitable means 11, the casing section being flanged at its opposite end as indicated at 12 for registry with a corresponding flange 13 extending radially from the centrally apertured portion 14 which is attached to the mounting flange 7 of the engine crankcase by suitable means 15; the flange 12 being supported on the flange 13 by bolts 16 which also retain in place the flange 17 of a transversely disposed plate 18 which has a central sleeve 19 adapted to receive ball bearing members 21 and 22 constituting with a spacer ring 23 the bearing assembly for an adapter shaft or sleeve 24 which has splined or equivalent engagement as indicated at 26 with the socket end 27 of the bevel gear 28 which is mounted on the engine shaft 29, driven by the crankshaft and retained in place thereon by suitable means 31.

As shown the adapter sleeve 24 receives the splined end of a sleeve 34 which is enlarged at its opposite end to form one element of a jaw clutch 36 having the usual inclined teeth adapted to be engaged for transmission of torque in one direction by a correspondingly toothed clutch element 37 similar in construction and function to the clutch element conventionally used on airplane engine starters, as for example that shown at 8 in the Lansing Patent No. 1,833,948. As shown, relative movement between the sleeves 24 and 34 is prevented by the provision of a through bolt 41 and a nut 42 engageable with the threaded end thereof. Limited axial movement of the jaw 37 in rotation with the corresponding clutch element 36 may be effected by any suitable means, not shown, as for example such as that disclosed in the aforesaid Lansing patent, and when such engagement is effected, the engine crankshaft 29 may be turned over, or the energy transmitted thereto through the starter shaft 44, clutch elements 36 and 37, the clutch element 37 being disengaged from the clutch element 36 automatically as soon as the engine develops self-sustaining power. To the extent thus far described, the action is comparable to that usually occurring in starting, and the means employed for drivably connecting the starter element 37 with the engine crankshaft, have been modified in such a way as to render the present invention most effectively applicable thereto. The manner of such application of the present invention to the aforesaid connecting means are now to be described.

Surrounding the clutch elements 36 and 37 in any concentric relation thereto there is provided a second normally disengaged clutch, one element 48 of which is secured against axial movement by suitable means herein shown in the form of a plurality of screws 49 preferably disposed at angularly spaced positions of 120 degrees, equally distant from the axis of the sleeve 34, the screws being embodied in a supporting plate 51 having a central hub portion 52 rotatably mounted within a suitable bearing sleeve 53 and a thrust collar 54 registering with the annular rim 56 projecting inwardly from the hub 19 of the previously described transverse flange.

The screws 49 serve as the mounting means for a ball bearing assembly 61 which in turn rotatably supports a corresponding number of planetary pinions 62, each of which meshes with teeth 63 provided on sleeve 34, and an internally toothed or splined annular member 64; the screws 49 having sleeve 66 mounted thereon to permit of rigid assembly of members 51 and 48, and to provide means for the support of the inner races of the bearing assemblies 61.

From the foregoing construction it is apparent that with the elements in the positions indicated in Fig. 1, rotation of the crankshaft 29 and sleeve 34 will produce corresponding rotation of the planetary pinions 62 about their axes and also about the axis of the sleeve 34. In order to retard such rotation; that is, rotation about the axis of the sleeve 34, when it is desired to bring the crankshaft 29 to a stop, the present invention provides a novel mechanism, one part of which is associated with the above described internally toothed ring 64 and the other part of which is engageable with the clutch element 48. The part of the mechanism associated with the toothed ring 64 includes a plurality of friction discs 67 of annular formation with their outer peripheries notched to register with the splines or teeth of the rings 64 and their inner peripheries terminating just short of a sleeve or barrel 69 which is splined both externally and internally as indicated at 71 and 72, respectively, the external spline 71 being engaged by a second series of friction discs 68 also of annular formation and with their inner peripheries notched to register with the splines 71, and their outer peripheries terminating just short of the toothed ring 64. The sleeve or barrel 69 is shouldered as indicated at 74, for registery with the spacer rings 75 which abut the face of the rim 77 of the clutch element 48, the latter being viewed in sleeve bearing 76 which thus acts to support one end of the planetary gear unit. Movement of the barrel 69 away from the element 48 is prevented by its engagement with the shoulder 81 on the casing section 9, while rotary movement is prevented by the provision of the dowel pin 82 in said shoulder portion 81.

In order to adjust the degree of frictional restraint which the discs 68—67 exercise upon the ring 64, said discs are clamped together by the provision of annular pressure plates 84 and 86 and a plurality of coiled compression springs 87 disposed in recesses 88 at angularly spaced positions about the flanged portion 89 of the barrel 69. A ring 91 threadedly engages the end portion of the barrel 69 and is held in its adjusted position by screws 92 which engage openings in the pressure plate 84 splined to barrel 69; the said pressure plate and screw thus constituting means for preventing a leftward movement, as viewed in Fig. 1 of the ring 91 from its adjusted relation to the remainder of the clutch assembly. A spacer ring 94 is provided between flange 89 and member 64 to prevent rightward axial movement of the latter, as viewed in Fig. 1.

The novel means for rendering effective the retarding means above described comprises a clutch element 97 of corresponding tooth formation to the clutch element 48 and engageable therewith upon being moved axially along the splines 72 of the barrel 69 by any suitable means, controllable by the operator, as for example the shifter arm 99 secured to the end of a rock shaft 100 journalled in boss 101 formed on the casing section 9 as shown in Fig. 2 and provided at its other end with a shifter yoke 102 the ends of which engage the circumferential groove 103 provided on the rearward extension of the clutch element 97. A torsion spring 104, one end of which is hooked about the upwardly extending boss 105 of the yoke 102, acts to exert a constant tendency upon the rock shaft 100 to release the clutch element 97 from the corresponding element 48 and so acts as soon as the operator releases his hold upon the arm 99.

From the foregoing description it is apparent that in normal running of the engine, the friction clutch holds the ring 64 from rotation and thus permits the planetary pinions 62 to revolve about the axis of sleeve 34, as well as rotate about their individual axes in response to the drive from the sun gear constituted by the teeth 63 cut on the engine engaged sleeve 34. In the event it becomes desirable to bring the engine crankshaft to a more or less sudden stop following de-energization of the engine, the arm 99 is shifted to the right as viewed in Fig. 1, thereby causing the clutch element 97 to engage the corresponding element 48 and lock the pinions 62 against rotation about the axis of the sleeve 34, the pinions being free to continue rotation about their individual axes while the shaft 34 is being braked by the action of the friction discs 67—68. This braking action will proceed until the sleeve 34 is about stopped, the length of time required for completion of the action depending upon the setting of the clutch ring 91 and the friction qualities of the discs 67—68.

In the embodiment of the invention shown in Figs. 3 and 4, the clutch 67—68 of the embodiment previously described is eliminated and its function is performed by the friction clutch discs 167 of the starter. Moreover, in this embodiment, the planetary gears 162 corresponding to those provided in a conventional starter, as indicated at 79 in the Lansing Patent No. 1,833,948 perform the added function of the planetary pinions shown at 62 in Fig. 1. Referring to this embodiment it will be seen that the reference character 111 designates the toothed end of the engine crankshaft 112, the said end extending beyond the crankcase flange 113 to which the housing 114 of the invention is attached. A pinion 116 is shown as formed on the extended portion of the crankshaft 112, in position to mesh with a gear 117. A pinion 118, formed integral with shaft 115 drives a gear 119 which is supported in any suitable manner, as on roller bearing 120 riding on steel race 121 held fast in the housing 114. Gears 117 and 118 are supported on bearings 123 and 124, the former bearing being housed in adapter plate 125. Gear 119 carries jaws 128 engageable with jaws 127 in member 130 splined to starter jaw 131. A groove is cut in member 130 for the reception of a pin in a crank or eccentric 132 on rockshaft 133 actuated by lever 126 under the control of the operator. Jaw 131 is splined in the usual manner to screw shaft 134 threaded in nut 135 of a conventional inertia starter, such as that shown in the aforesaid Lansing patent. The starter has, in addition, a one-way pawl 136 supported on shaft 137 in section 138 of the starter housing and engaging with ratchet teeth formed on the outer surface of the internally toothed gear 139, the hub 141 of which is toothed to form a sun pinion meshing with planet pinions 162 above referred to.

The engine is started in the usual way by bringing the flywheel 143 up to speed (with pawl 136 in the disengaged position, to which it may be swung by suitable means, not shown) and then meshing jaws 131 and 111. When the engine starts, gears 116 and 117 are rotated. Due to the ratio of the gears, 119 is a relatively slow speed member, and jaw 127 may readily be meshed to jaw 128. Torque is then transmitted from the engine to member 130 and jaw 131, thence to screw shaft 134, which latter thereupon tends to be screwed to the right, but inasmuch as splines 140 abut the end of nut 135 in the disengaged position of jaws 111 and 131, no movement of screw shaft 134 occurs. Slipping of clutch 141 occurs due to the fact that barrel 147 is held by the inability of gears 162 connected between it and gear 139 to turn; pawl 137 being in engagement therewith to prevent such turning. The engine is therefore braked and comes to a stop.

There is thus disclosed a mechanism which, in the form shown, will act efficiently as a brake on a disabled engine, and is of a construction as to render it possible to install it as part of the engine starting unit. It is to be understood, however, that the latter feature is optional and may be dispensed with, as well as the other details not essential to the basic principles of the invention in its broadest aspects, as indicated in the broadest of the appended claims. Certain of the other appended claims, however, are directed to these optional features, as they also constitute a part of the invention when considered in its other phases. Reference is therefore to be had to all of the appended claims for a definition of the entire scope of the invention.

What is claimed is:

1. The combination with an internal combustion engine and starting means therefor, said starting means including a friction clutch, of means acting through said friction clutch for stopping the engine, said last-mentioned means including an element normally disengaged from, but movable to engage and rotate with an engine driven part.

2. The combination with an internal combustion engine of a friction brake and a toothed clutch element, means for engaging said clutch element with said engine, means acting through said friction brake for stopping the engine, said last mentioned means including a normally stationary sleeve surrounding the engine engaging clutch element, and means for connecting said sleeve with an engine driven part.

3. Control means for an internal combustion engine comprising, in combination with a rotatable shaft constituting a permanently connected part of the engine, a pair of shafts normally disconnected from each other, means for drivably connecting one of said pair of shafts with said engine shaft, stopping means for the engine, means for connecting said pair of shafts to render said stopping means effective, said last named means comprising relatively movable clutch elements in axial alignment with said engine shaft, and a plurality of friction elements rotatable therewith, and constituting part of said stopping means.

4. The combination with an internal combustion engine of a friction brake having two sets of inter-engaging friction elements, all of which remain ineffective for braking purposes during self-energized running of the engine, and means for causing one set of said friction elements to rotate in a forward direction with the engine while the other set remains stationary, and means for rotating both said sets of friction elements to transmit starting torque to the engine.

5. The combination with an internal combustion engine of a friction brake having inter-engaging friction elements which remain ineffective for braking purposes during self-energized running of the engine, and means for causing one of said friction elements to rotate in a forward direction with the engine while the other remains stationary, and means for rotating both said friction elements to transmit starting torque to the engine.

6. The combination with an internal combustion engine of a friction brake having inter-engaging friction elements which remain inactive during self-energized running of the engine, and means for causing one of said friction elements to rotate relatively to the other in the event of cessation of combustion within the engine and thereby prevent prolonged rotation of the engine driven parts, said means including an element normally disengaged from, but movable to engage and rotate with an engine driven part.

7. In combination with an internal combustion engine having a crankcase provided with a mounting flange, a sub-casing attachable to said mounting flange, means within said sub-casing for engagement with a rotatable member of the engine and means disposed within said sub-casing controllable manually and subsequent to such engagement to bring the forward rotational movement of said rotatable member to a stop.

8. In combination with an internal combustion engine, starting means therefor, said starting means including a clutch element normally disengaged from but movable to engage and crank a member of the engine to be started, and means including a plurality of rotatable clutch elements for exercising a braking action on said engine member and adapted to be rotated following disengagement of said first named clutch element.

9. Control means for an engine crankshaft, comprising a gear train including a pair of constantly meshed gears, one of which has planetary movement with respect to the other, means for connecting said gear train with said crankshaft, and means to exert a braking action to retard the forward rotation of said crankshaft, said last-named means including a non-rotatable sleeve concentric with one of said pair of constantly meshed gears, and a friction brake one part of which is connected to said sleeve and the other part to the other of said pair of constantly meshed gears.

10. Control means for an internal combustion engine comprising, in combination with a rotatable shaft constituting a permanently connected part of the engine, a shaft normally disconnected from said engine shaft, means for drivably connecting said shafts, said shafts being self-disengaging when the engine starts, stopping means for the engine and means for reconnecting said shafts to render said stopping means effective.

11. Control means for an internal combustion engine comprising, in combination with a rotatable shaft constituting a permanently connected part of the engine, a shaft normally disconnected from said engine shaft, means for drivably connecting said shafts, said shafts being self-disengaging when the engine starts, and means for re-connecting said shafts, said last named means comprising a pair of relatively movable clutch elements and a plurality of friction elements rotatable with said last named means.

12. Control means for an internal combustion engine comprising, in combination with a rotatable shaft constituting a permanently connected part of the engine, a shaft normally disconnected from said engine shaft, means for drivably connecting said shafts, said shafts being self-disengaging when the engine starts, means for re-connecting said shafts, said last named means comprising a pair of concentrically disposed clutch elements having inter-engaged surfaces extending axially as well as radially, and a plurality of friction elements rotatable with said last named means.

13. Control means for an internal combustion engine comprising, in combination with a rotatable shaft constituting a permanently connected part of the engine, a shaft normally disconnected from said engine shaft, means for drivably connecting said shafts, said shafts being self-disengaging when the engine starts, means for re-connecting said shafts, said last named means comprising a pair of concentrically disposed clutch elements having parts permanently engaged and complementary parts normally disengaged from said first named parts, and a plurality of friction elements rotatable with said last named means.

14. In combination with an internal combustion engine, starting means therefor, said starting means including a friction clutch, a second clutch element normally disengaged from but movable to engage and crank a member of the engine to be started, and means including a third clutch mechanism engageable to cause said friction clutch to exercise a braking action on said engine member during forward rotation thereof.

15. In combination with an internal combustion engine, starting means therefor, said starting means including a friction clutch, a second clutch element normally disengaged from but movable to engage and crank a member of the engine to be started, and means including a third clutch mechanism engageable to cause said friction clutch to exercise a braking action on said engine memebr during forward rotation thereof, all three of said clutch mechanisms being disposed in coaxial relationship to said engine member.

16. The combination with an internal combustion engine and a starter having a clutch part engageable with a crankshaft connected member of the engine, of means including a friction brake for preventing prolonged rotation of the engine crankshaft in the event of cessation of combustion within the engine, said preventing means also including a normally stationary sleeve surrounding said clutch part, and manually operable means for connecting said sleeve for rotation with the engine, whenever application of the friction brake is desired.

17. The combination with an internal combustion engine and a starter having a clutch part engageable with a crankshaft connected member of the engine, of means for preventing prolonged rotation of the engine crankshaft in the event of cessation of combustion within the engine, said preventing means including a normally stationary sleeve surrounding said clutch part, and manually operable means for connecting said sleeve for rotation with the engine, whenever application of the rotation preventing means is desired.

18. Control means for an aircraft engine crankshaft, comprising a clutch part rotatable with said crankshaft and a mating clutch part for engagement therewith during starting of the engine, and means having as its primary function the exertion of a braking action to prevent continued rotation of the engine crankshaft, said means including additional clutch elements which surround said first-named clutch parts and remain disengaged until application of the braking action is desired.

19. Control means for an aircraft engine crankshaft, comprising a clutch part rotatable with said crankshaft and a mating clutch part for engagement therewith during starting of the engine, and means having as its primary function the exertion of a braking action to prevent continued rotation of the engine crankshaft, said means including additional clutch elements which surround said first-named clutch parts and remain disengaged until application of the braking action is desired, and further including a third set of clutch elements providing friction surfaces for absorption of the energy tending to cause such continued rotation.

ROMEO M. NARDONE.